US010243668B2

United States Patent
Chen et al.

(10) Patent No.: US 10,243,668 B2
(45) Date of Patent: Mar. 26, 2019

(54) POSITIONING MEASUREMENT DEVICE AND THE METHOD THEREOF

(71) Applicant: INDUSTRIAL TECHNOLOGY RESEARCH INSTITUTE, Chutung, Hsinchu (TW)

(72) Inventors: Chien-Wen Chen, Pingtung County (TW); Fu-Cheng Yang, Hsinchu County (TW); Pei-Wen Yen, New Taipei (TW); Shu-Ping Dong, Hsinchu (TW)

(73) Assignee: INDUSTRIAL TECHNOLOGY RESEARCH INSTITUTE, Chutung, Hsinchu (TW)

( * ) Notice: Subject to any disclaimer, the term of this patent is extended or adjusted under 35 U.S.C. 154(b) by 0 days.

(21) Appl. No.: 15/395,344

(22) Filed: Dec. 30, 2016

(65) Prior Publication Data

US 2017/0314972 A1 Nov. 2, 2017

Related U.S. Application Data

(60) Provisional application No. 62/328,599, filed on Apr. 27, 2016.

(30) Foreign Application Priority Data

Oct. 17, 2016 (TW) .............................. 105133434 A
Oct. 21, 2016 (TW) .............................. 105134040 A

(51) Int. Cl.
*H04B 10/60* (2013.01)
*G01D 5/347* (2006.01)
(Continued)

(52) U.S. Cl.
CPC ......... *H04B 10/60* (2013.01); *G01D 5/34746* (2013.01); *G01D 5/34792* (2013.01);
(Continued)

(58) Field of Classification Search
CPC .......... G02B 5/1861; G01D 5/38; G01D 5/36; G01D 5/366; H03M 1/30
(Continued)

(56) References Cited

U.S. PATENT DOCUMENTS 4,079,252 A * 3/1978 Brake ...................... G01D 5/38
250/237 G
4,445,110 A 4/1984 Breslow
(Continued)

FOREIGN PATENT DOCUMENTS

CN 1359196 A 7/2002
CN 1658513 A 8/2005
(Continued)

OTHER PUBLICATIONS

Chu-Chun Tsai, "Research and Development for Absolute Rotary Encoder", thesis for Mingdao University, Jul. 17, 2012, 108 pages.
(Continued)

*Primary Examiner* — Isiaka O Akanbi
(74) *Attorney, Agent, or Firm* — Muncy, Geissler, Olds & Lowe, P.C.

(57) ABSTRACT

A positioning measurement device is provided. The device includes a light source, a grating, and plural light sensors. A periodic light field is generated by light emitted by the light source and passes through the grating to. The plural light sensors are periodically spaced. The light sensors are used to sense the periodic light field for generating a plurality of positioning measurement signals.

23 Claims, 9 Drawing Sheets

(51) Int. Cl.
*G02B 5/18* (2006.01)
*H04L 7/00* (2006.01)

(52) U.S. Cl.
CPC .......... *G02B 5/1861* (2013.01); *H04L 7/0075* (2013.01); *H04L 7/0079* (2013.01)

(58) Field of Classification Search
USPC ................................................ 356/614–624
See application file for complete search history.

(56) References Cited

U.S. PATENT DOCUMENTS

| | | | |
|---|---|---|---|
| 4,947,166 A | 8/1990 | Wingate et al. | |
| 5,064,290 A * | 11/1991 | McMurtry | G01D 5/38 250/231.16 |
| 5,113,066 A * | 5/1992 | Michel | G01D 5/38 250/205 |
| 5,173,693 A | 12/1992 | Fry | |
| 5,214,280 A * | 5/1993 | Rieder | G01D 5/38 250/231.16 |
| 5,534,692 A * | 7/1996 | Nakayama | G01D 3/063 250/231.16 |
| 5,563,408 A * | 10/1996 | Matsumoto | G01D 5/2455 250/231.14 |
| 5,572,019 A | 11/1996 | Sakuma | |
| 5,689,336 A * | 11/1997 | Huber | G01D 5/38 250/237 G |
| 5,774,219 A | 6/1998 | Matsuura | |
| 5,799,010 A | 8/1998 | Lomp et al. | |
| 5,886,352 A | 3/1999 | Wright et al. | |
| 5,889,280 A | 3/1999 | Matsuura | |
| 6,472,658 B2 | 10/2002 | Mayer et al. | |
| 6,552,810 B1 | 4/2003 | Hermann et al. | |
| 6,635,863 B1 | 10/2003 | Nihommori et al. | |
| 6,660,997 B2 * | 12/2003 | Laberge | G01D 5/26 250/231.18 |
| 6,759,647 B2 | 7/2004 | Ito et al. | |
| 6,791,699 B2 * | 9/2004 | Aoki | G01D 5/347 250/237 G |
| 6,794,637 B1 | 9/2004 | Holzapfel et al. | |
| 6,963,409 B2 | 11/2005 | Benner et al. | |
| 7,470,892 B2 | 12/2008 | Ohmura et al. | |
| 7,608,813 B1 | 10/2009 | Milvich et al. | |
| 7,969,579 B2 | 6/2011 | Holloway | |
| 8,325,066 B2 | 12/2012 | Kato | |
| 8,488,131 B2 * | 7/2013 | Horiguchi | G01D 5/38 250/231.13 |
| 8,665,208 B2 | 3/2014 | Lee et al. | |
| 8,994,958 B2 | 3/2015 | Holzapfel | |
| 9,013,710 B2 | 4/2015 | Hermann | |
| 9,303,981 B2 | 4/2016 | Schoser et al. | |
| 2003/0035489 A1 | 2/2003 | Gorday et al. | |
| 2005/0168757 A1 | 8/2005 | Benner et al. | |
| 2006/0156187 A1 | 7/2006 | Wu et al. | |
| 2006/0267231 A1 * | 11/2006 | Van Santen | B29C 43/003 264/40.1 |
| 2007/0102630 A1 | 5/2007 | Igaki et al. | |
| 2007/0153292 A1 | 7/2007 | Mitchell et al. | |
| 2007/0186431 A1 | 8/2007 | Mittmann et al. | |
| 2009/0180125 A1 | 7/2009 | Holloway | |
| 2009/0256065 A1 | 10/2009 | Kusano et al. | |
| 2010/0027597 A1 | 2/2010 | Scheuermann | |
| 2011/0099411 A1 | 4/2011 | Lin | |
| 2011/0103432 A1 | 5/2011 | Tangudu et al. | |
| 2012/0261561 A1 | 10/2012 | Horiguchi et al. | |

FOREIGN PATENT DOCUMENTS

| | | |
|---|---|---|
| CN | 101303222 A | 11/2008 |
| CN | 201726497 U | 1/2011 |
| CN | 103411540 | 11/2013 |
| CN | 103557878 | 2/2014 |
| EP | 0543513 | 5/1993 |
| TW | I405122 | 8/2013 |
| TW | I519906 | 2/2016 |

OTHER PUBLICATIONS

Chen et al., "A Coding and Decoding Method for the Single-Ring Absolute Optical Encoder", Opto-Electronic Engineering, Jun. 2013, vol. 40, No. 6, 10 pages.

Zhang et al., "Upper Bound of Single-track Gray Codes and the Combined Coding Method of Period 2n", 2013 8$^{th}$ International Forum on Strategic Technology (IFOST),,Jun. 28-Jul. 1, 2013. 5 pages.

Crespo et al., "Reflection optical encoders as three-grating moire systems", Applied Optics, Aug. 1, 2000, vol. 39, No. 22, pp. 3805-3813.

Hopp et al., "A novel diffractive encoding principle for absolute optical encoders", Proc. of SPIE, vol. 8082, Optical Measurement Systems for Industrial Inspection VII, May 27, 2011, 15 pages.

\* cited by examiner

POSITIONING MEASUREMENT DEVICE AND THE METHOD THEREOF

CROSS REFERENCE TO RELATED APPLICATION

This application claims the priority benefits of U.S. provisional application Ser. No. 62/328,599 filed on Apr. 27, 2016, Taiwan application serial no. 105133434, filed on Oct. 17, 2016, and Taiwan application serial no. 105134040, filed on Oct. 21, 2016. The entirety of the above-mentioned patent application is hereby incorporated by reference herein.

TECHNICAL FIELD

The technical field generally relates to a positioning measurement device and the method thereof.

BACKGROUND

An optical encoder (such as an optical rotary encoder, an optical scale, and so on hereafter referred to as an optical encoder in the specification) could be an incremental type optical encoder or an absolute type optical encoder according to its output configurations. The absolute type optical encoder could directly output an absolute value of a displacement coordinate without any error accumulation. The minimum measureable unit of the incremental type optical encoder is based on the incremental grating. The output of the incremental signal could be an orthogonal output signal (for example, a sinusoidal signal or a cosine signal), by which a receiving end could calculate with a high-resolution interpolation, so as to obtain more detailed displacement resolution information than that provided by the absolute type optical encoder. Therefore, how to design an incremental type optical encoder is one of important topics for the industry.

SUMMARY OF THE DISCLOSURE

According to an embodiment of this disclosure, a positioning measurement device is provided. The device includes a light source, a grating, and plural light sensors. A periodic light field is generated by light emitted by the light source and passing through the grating. The plural light sensors are periodically spaced. The light sensors are used to sense the periodic light field for generating a plurality of positioning measurement signals.

According to another embodiment of this disclosure, a positioning measurement method is provided. This method includes: generating a periodic light field by light emitted by a light source and passing through a grating; and sensing, by plural light sensors, the periodic light field for generating a plurality of positioning measurement signals, wherein the plural light sensors are periodically spaced.

The foregoing will become better understood from a careful reading of a detailed description provided herein below with appropriate reference to the accompanying drawings.

DETAILED DESCRIPTION OF DISCLOSED EMBODIMENTS

Figure 1A:
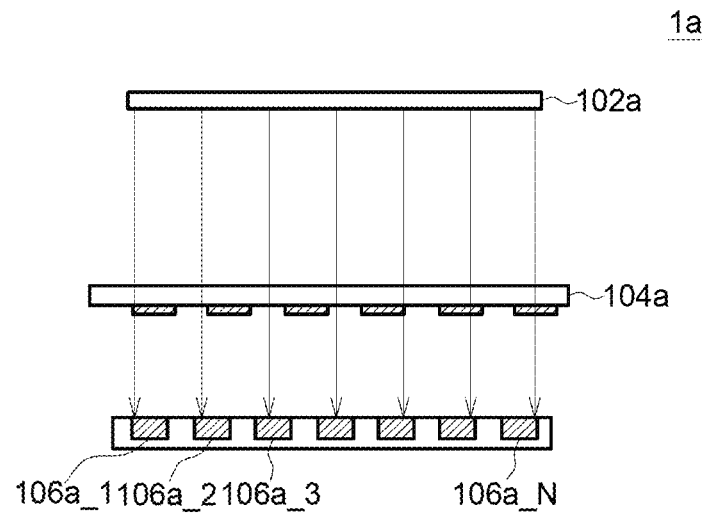
FIG. 1A is a schematic diagram illustrating a transparent type positioning measurement device according to an embodiment of this disclosure.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

A Moiré pattern is commonly used for the optical encoder. A related position of two gratings is mathematically derived by overlapping two gratings with different periods on the optical path and measuring Moiré light intensities at several particular positions. The period of the Moiré signal of the optical encoder is longer. It is generally 10 times the period of the grating. The scale of the defect ranging from 1 to 5 periods is comparatively smaller than the size of the Moiré fringe or the sensor. Minor defect interference (for example, an external particle, a scratch, a pinhole, a gap/an angle between the encoder head and the grating scale, the flatness of the surface of a glass, an assembly error, or environmental pollution) might be an interference of the single sensor, thereby causing a direct current (DC) bias or an amplitude drift of the sensor. Therefore, it is difficult to form a good suppression of the common-mode noise, and might degrade the robustness of the optical scale to the environment interference, thereby resulting in the phenomenon of unstable positioning. If a period difference of two gratings with different periods is added to reduce the period of the Moiré signal of the optical scale, the period of the Moiré might become unapparent. That is, the spatial frequency of the Moiré mixes up spatial frequencies of two gratings with different periods. The phenomenon of mixing low frequency with high frequency will result in the difficulty to measure signals.

This disclosure provides a positioning measurement device with the design of a Moiré signal having a shorter period (for example, 3 times the period of a grating). A plurality of sensors that are periodically spaced in a spatial domain are utilized to form one of the geometrical dimensions of the grating for Moiré calculation. The distribution of a periodic optical field is formed by a parallel light source passing through a periodic grating. The output spatially integrated by the sensor for the intensity of the distribution of the periodic optical field will be equivalent to the output of the Moiré calculation. Therefore, the equivalent Moiré period may be reduced to increase the degree of common mode to the external interference for the output signal of the sensor. In the meantime, the difference between the period of the sensor and the period of the original grating becomes larger, so as to increase the tolerance of the alignment between the grating scale and the encoder head.

FIG. 1A shows a transparent type positioning measurement device 1a according to an embodiment of this disclosure. The positioning measurement device 1a comprises a light source 102a, a grating 104a, and a plurality of optical sensors 106a_1~106a_N. In this embodiment, the light source 102a may be, but not limited to a collimated light source for emitting collimated light having a single wavelength. A periodic optical field LFa (not shown) is generated by the light emitted by the light source 102a and passing through the grating 104a. The optical sensors 106a_1~106a_N are periodically spaced. For example, the intervals between every two of optical sensors 106a_1~106a_N are at a constant distance for sensing the periodic optical field LFa to generate a plurality of positioning measurement signals. A plurality of positioning measurement signals may be, but not limited to, orthogonal signals. According to the amplitudes and the phases of the positioning measurement signals, an incremental displacement output is obtained.

Figure 1B:
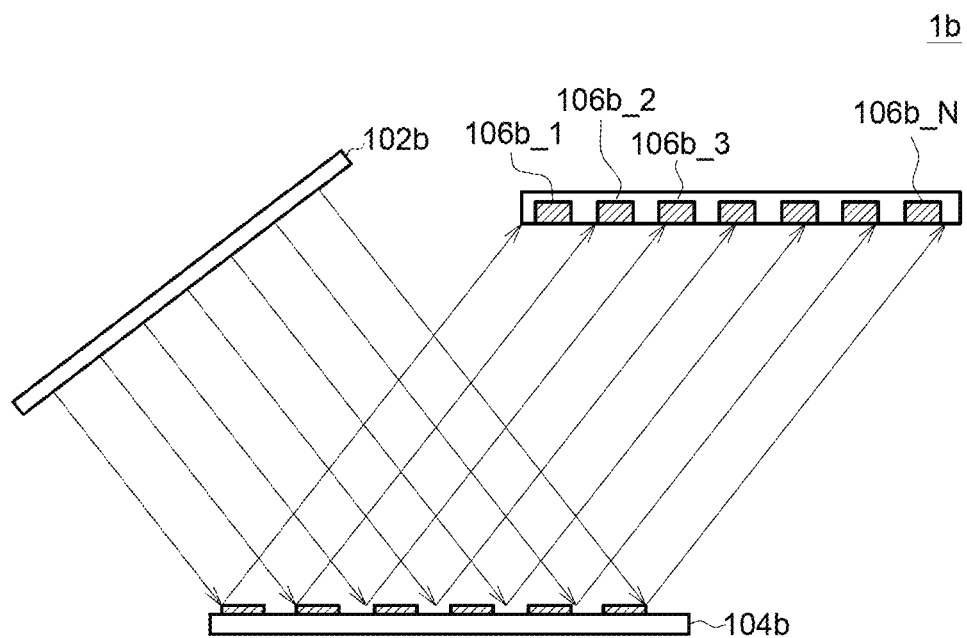
FIG. 1B is a schematic diagram illustrating a reflective type positioning measurement device according to an embodiment of this disclosure.

The positioning measurement device 1a shown in FIG. 1A has a transparent type structure. The grating 104a is a transparent type grating. The light source 102a and the optical sensors 106a_1~106a_N are respectively disposed on two sides of the grating 104a. A reflective type structure, as shown in FIG. 1B, may also be used. FIG. 1B shows a reflective type positioning measurement device 1b. The positioning measurement device 1b comprises a light source 102b, a grating 104b, and a plurality of optical sensors 106b_1~106b_N. The grating 104b may be a reflective type grating or the grating 104b comprises a reflective mirror reflecting the light emitted from the light source 102b. In this embodiment, a periodic optical field LFb is generated by the light which is from the light source 102b and is reflected by the grating 104b. The optical sensors 106b_1~106b_N sense the periodic optical field LFb to generate a plurality of positioning measurement signals.

Figure 2A:
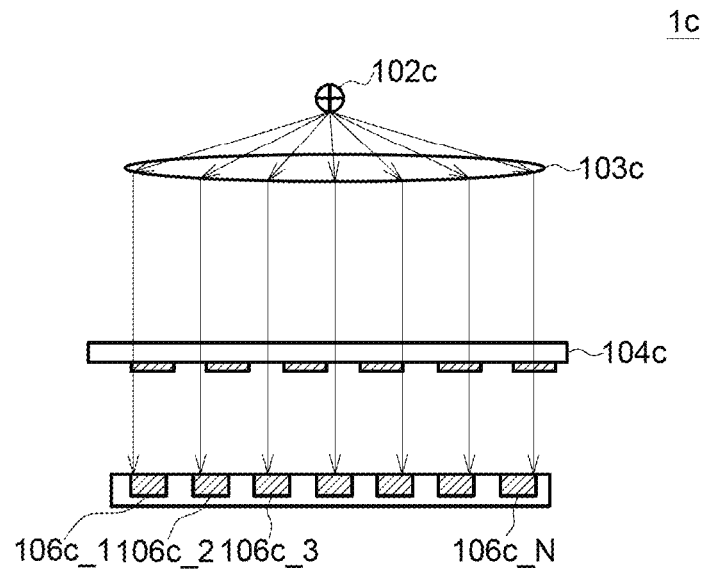
FIG. 2A is a schematic diagram illustrating a transparent type positioning measurement device according to an embodiment of this disclosure.

In another embodiment, a point light source may also be used. FIG. 2A shows a transparent type positioning measurement device 1c according to an embodiment of this disclosure. The positioning measurement device 1c comprises a light source 102c, a collimator 103c, a grating 104c, and a plurality of optical sensors 106c_1~106c_N. The light source 102c may be a light emitting diode (LED) having a single wavelength for providing a light source with a small divergence angle. The collimator 103c for providing collimated light is disposed between the light source 102c and the grating 104c. A periodic optical field LFc is generated by the light emitted by the light source 102c and passing through the collimator 103c and the grating 104c. The optical sensors 106c_1~106c_N sense the periodic optical field LFb to generate a plurality of positioning measurement signals.

Figure 2B:
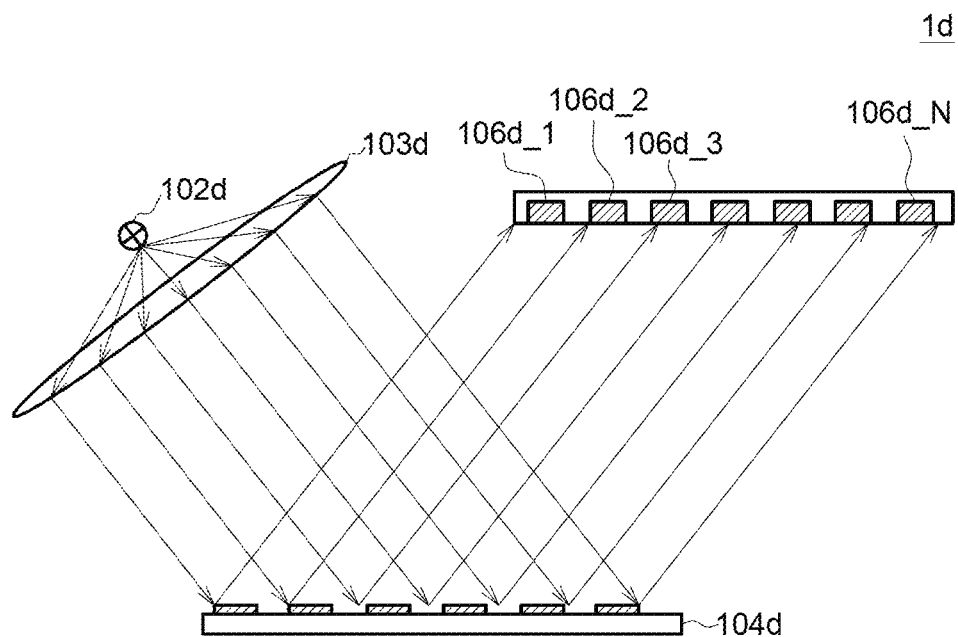
FIG. 2B is a schematic diagram illustrating a reflective type positioning measurement device according to an embodiment of this disclosure.

Similarly, a reflective type structure may also be used according to an embodiment. FIG. 2B shows a reflective type positioning measurement device 1d. The position measurement device 1d comprises a light source 102d, a collimator 103d, a grating 104d, and a plurality of optical sensors 106d_1~106d_N. The grating 104d is a reflective type grating. A periodic optical field LFd is generated by the light emitted by the light source 102d and passing through the collimator 103d and reflected by the grating 104d. The optical sensors 106d_1~106d_N sense the periodic optical field LFd to generate a plurality positioning measurement signals.

For the embodiments in FIGS. 1A, 1B, 2A and 2B, the distance between the grating 104 and the optical sensor 106 may be appropriately arranged, so that the optical filed generated by the grating 104 may be reconstructed at the location of the optical sensor 106. The transparent type structure is taken as an example. The optical sensor 106 may be disposed near the grating 104, so that the optical sensor 106 may sense the near-field distribution of the periodic optical field LF generated by the grating 104. On the other hand, for the reflective type structure, the distance between the optical sensor 106 and the grating 104 is longer. The far-field distribution of the periodic optical field LF generated by the grating 104 changes with different distances. In order to reconstruct the optical field of the grating 104, the distance related to a Talbot distance $Z_T$ between the optical sensor 106 and the grating 104 may be arranged, wherein $$Z_T = \frac{2P_g^2}{\lambda}$$

($\lambda$ is the wavelength of the light emitted by the light source 102; Pg is the period of the grating. For example, the period Pg of the grating 104 is 20 μm. The wavelength of the light emitted from the light source 102 is 650 nm. Talbot distance $Z_T$ is about 1200 μm.

When the distance between the optical sensor 106 and the grating 104

$$\left(n+\frac{1}{2}\right)Z_T$$

(n is natural number), the pattern of the original grating may be reconstructed with a spatial phase shift of 180°. When the distance between the optical sensor 106 and the grating 104 is $nZ_T$, the optical field image of the original grating may be obtained. When the distance between the optical sensor 106 and the grating 104 is $$\left(\frac{2n+1}{4}\right)Z_T,$$

a frequency-doubling image of the grating will be shown. The Talbot effect may average defects. In other words, the non-periodic images of the non-periodic signals are gradually weakened while the distance is increased.

For the transparent type structure and the reflective type structure, the distance related to the Talbot distance between the grating 104 and the optical sensor 106 may be set for reconstructing the distribution of an optical field, so that the optical sensor 106 may successfully sense the periodic optical field LF. In another embodiment, a grating image generated by the grating 104 is formed at the location of the optical sensor 106 through an image forming device.

Figure 3A:
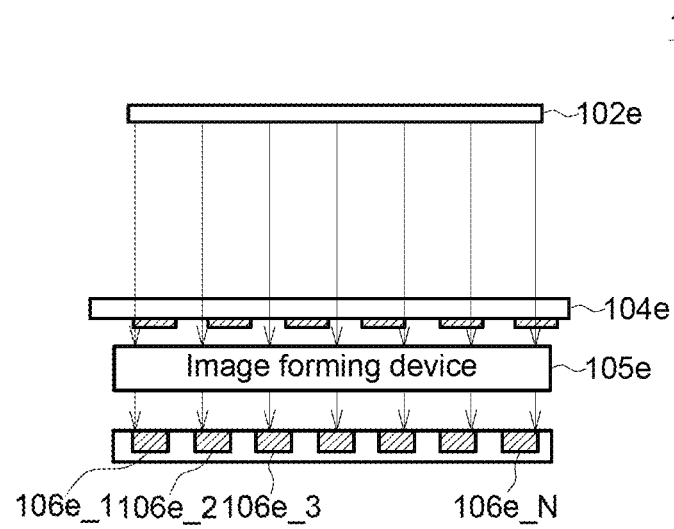
FIG. 3A is a schematic diagram illustrating a transparent type positioning measurement device according to an embodiment of this disclosure.

FIG. 3A shows a transparent type positioning measurement device 1e according to an embodiment of this disclosure. The positioning measurement device 1e comprises a light source 102e (in this embodiment, a collimated light source or a point light source combined with a collimator may be used), a grating 104e, an image forming device 105e, and a plurality of optical sensors 106e_1~106e_N. The image forming device 105e is disposed between the grating 104e and the optical sensors 106e_1~106e_N. The image forming device 105e comprises a convex lens. The light emitted by the light source 102e and passing through the grating 104e and the image forming device 105e forms a periodic optical field LFe at the locations of optical sensors 106e_1~106e_N.

Figure 3B:
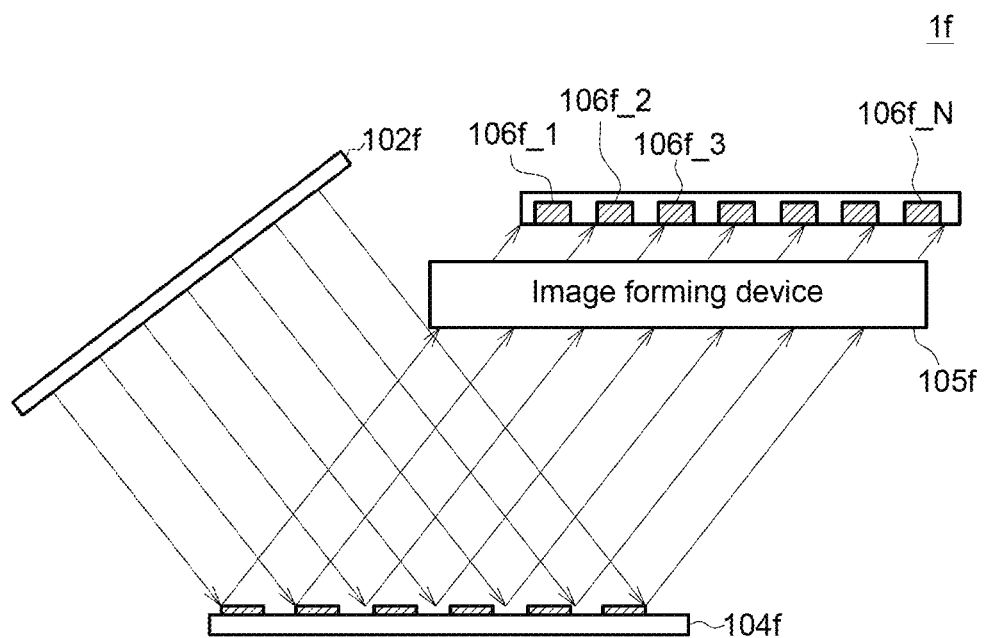
FIG. 3B is a schematic diagram illustrating a reflective type positioning measurement device according to an embodiment of this disclosure.

FIG. 3B shows a reflective type positioning measurement device 1f according to an embodiment of this disclosure. The positioning measurement device 1f comprises a light source 102f (in this embodiment, a collimated light source or a point light source combined with a collimator may be used), a grating 104f, an image forming device 105f, and a plurality of optical sensors 106f_1~106f_N. The image forming device 105f is disposed between the grating 104f and the optical sensors 106f_1~106f_N. The image forming device 105f comprises a convex lens. The light emitted by the light source 102f and passing through the image forming device 105f and reflected by the grating 104f forms a periodic optical field LFf at the locations of optical sensors 106f_1~106f_N.

For the embodiments in FIG. 3A and FIG. 3B, the distribution of the optical field generated by the grating 104 may be formed at the location of the optical sensor 106 through the image forming device 105, so that the optical sensor 106 senses the periodic optical field to obtain positioning measurement information. The image forming device 105 may be implemented in different ways. The image forming device 105 may comprise a lens set, an optical fiber lens, a relay lens, or a microlens. By appropriately selecting a lens and a focal distance, the image of the grating may be formed at the location of the optical sensor 106.

FIG. 1A to FIG. 3B show possible embodiments for positioning measurement devices comprising a transparent type structure and a reflective type structure according to this disclosure. The following description will further describe that a plurality of optical sensors 106_1~106_N sense a periodic optical field LF for generating a plurality positioning measurement signals. The following description may be applied to the embodiments in FIG. 1A to FIG. 3B. The component numbers 106_1~106_N are used for representing the optical sensors in these embodiments. The abbreviation LF is used for representing the periodic optical fields in these embodiments. These optical sensors 106_1~106_N are periodically spaced. The interval for the periodically-spaced arrangement is one sensing period Ps. A sensing period Ps may represent such as the distance between the sensing center of the optical sensor 106_1 and the sensing center of the optical sensor 106_2, the distance between the sensing center of the optical sensor 106_2 and sensing center of the optical sensor 106_3, and so on and so forth. A period of the grating 104 is Pg. The Pg may be the period of the periodic optical field LF generated at the locations of the optical sensors 106_1~106_N. Therefore, these optical sensors 106_1~106_N sample the periodic optical field LF having a spatial sensing period Pg, by using the sensing period Ps in the spatial domain.

The sensing period Ps is not equal to the period Pg of the grating. Therefore, the optical sensors 106_1~106_N may obtain the information of different phases of the periodic optical field LF. With such a spatial sampling method, the optical sensor 106 may generate an equivalent effect of performing a convolution for the periodic optical field LF. In other words, there is no light overlapping phenomenon or Moiré pattern in the spatial domain. Instead, the equivalent overlapping result occurs inside the optical sensor 106.

Figure 4:
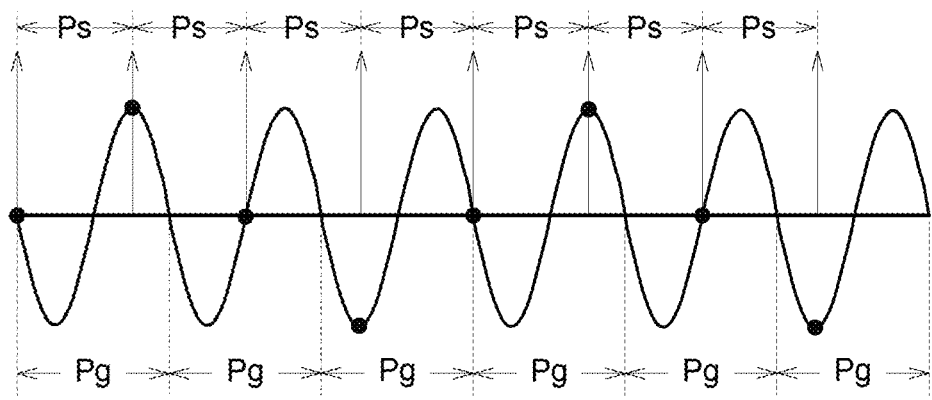
FIG. 4 is a schematic diagram illustrating a periodic optical field sampled by the optical sensor according to an embodiment of this disclosure.

FIG. 4 is a schematic diagram illustrating the periodic optical field sampled by an optical sensor according to an embodiment of this disclosure. In the figure, a sinusoidal wave is used to represent radiant distribution of the periodic optical field LF for expressing the periodic characteristic of the optical field. A period of the periodic optical field LF is Pg. A spatial period for the arrangement of the optical sensor 106 is the sensing period Ps. The sampling location of the optical sensor 106 is indicated by the arrows. For example, in this embodiment, four optical sensors are disposed within three optical periods for achieving the spatial sampling. The sampling method may be non-periodic and the sampling method coincides with the position of the periodic sampling method.

A sensing period Ps may be set based on the period Pg of the grating 104 according to the following equation $$n_A = \frac{P_A}{P_s} = \frac{P_g}{|P_g - P_s|}.$$

$P_A$ is an equivalent Moiré period $$\left(P_A = \frac{P_s \cdot P_g}{|P_g - P_s|}\right)$$

formed inside the optical sensor 106. $n_A$ is a positive integer and is the number of positioning measurement signals output by the optical sensor 106. For example, a period Pg of the grating 104 is 20 µm. If there are four positioning measurement signals ($n_A=4$) with a phase difference of 90°

$$\left(\frac{360°}{n_A} = 90°\right)$$

output by the optical sensor 106, then $$|P_g - P_s| = \frac{P_g}{n_A} = 5 \ \mu m.$$

Therefore, the sensing period Ps $$P_s = P_g \times \left(1 \pm \frac{1}{n_A}\right),$$

and the sensing period may be set to 15 µm or 25 µm. If a sensing period Ps is set to 15 µm, an equivalent Moiré period $P_A$ is 60 µm. If a sensing period Ps is set to 25 µm, an equivalent Moiré period $P_A$ is 100 µm. In the abovementioned example, the equivalent Moiré period PA is 3 times greater than the period Pg of the grating. Comparing with a Moirè period generated with two gratings having different periods, the Moirè period is usually 10 times greater than the period of the grating. The positioning measurement device disclosed in this disclosure may effectively decrease the Moirè period to reduce the interference of external noise.

In another example, a period Pg of the grating 104 is also 20 µm. An equivalent Moiré period $P_A$ 80 µm may be obtained by setting a sensing period Ps to 26.667 µm. Three positioning measurement signals ($n_A=3$) with the phase difference $$\frac{360°}{n_A} = 120°$$

and outputted by the optical sensor 106 respectively correspond to phase signals with 0°, 120° and 240°. With the aforementioned equation, the sensing period Ps may be set according to a design requirement.

Figure 5:
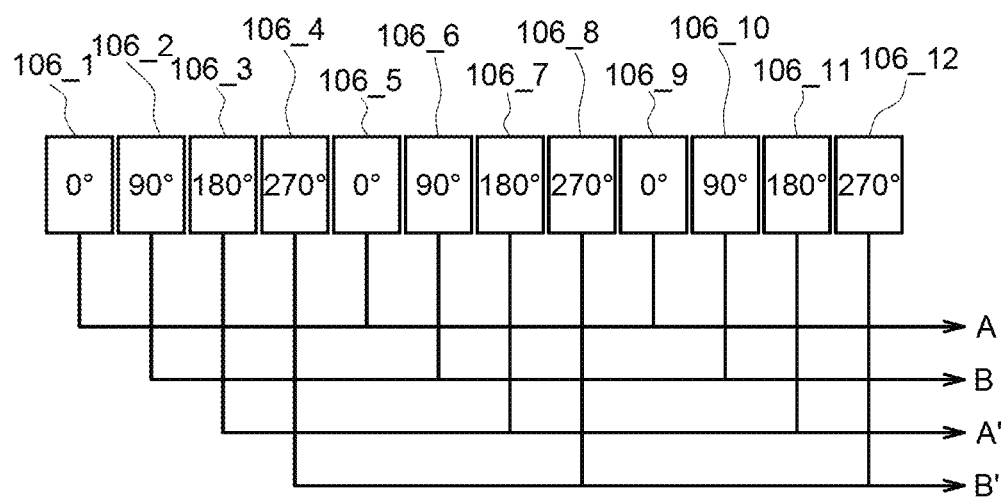
FIG. 5 is a schematic diagram illustrating plural optical sensors according to an embodiment of this disclosure.

FIG. 5 shows plural optical sensors according to an embodiment of this disclosure. Following the example in FIG. 4, four optical sensors disposed within three structured light periods may generate four positioning measurement signals with 90° phase differences which respectively correspond to phase signals with 0°, 120°, 180° and 270°. As shown in FIG. 5, optical sensors 106_1, 106_2, 106_3, 106_4, 106_5, 106_6, 106_7 and 106_8 respectively correspond to phase signals with 0°, 90°, , 180°, 270°, 0°, 90°, 180° and 270°. The optical sensors 106_2, 106_6, and 106_10 correspond to the same phase (90°). Those signals generated by the optical sensors 106_2, 106_6, and 106_10 may be coupled for generating a positioning measurement signal B with the phase of 90° by performing a calculating operation. FIG. 5 showing that these three signal lines are directly connected to each other is a simplified schematic drawing. For an implementation, these three signal lines generate a final positioning measurement signal B after an appropriate calculation is performed. Similarly, positioning measurement signals with different phases may be generated by using a similar method. Therefore, the optical sensor 106 may output 4 positioning measurement signals A, B, A', and B' respectively corresponding to phase signals with 0°, 90°, 180° and 270°. These phase signals are for example, a sin function, a cos function, a −sin function and −cos function, respectively.

Figure 6:
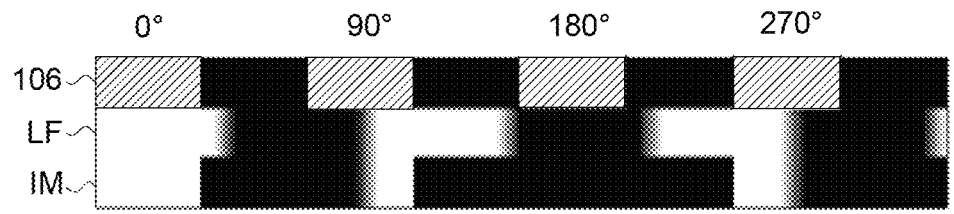
FIG. 6 shows a schematic drawing illustrating the arrangement of optical sensors, a grating image and an equivalent output of the optical sensors according to an embodiment of this disclosure.

According to an embodiment of this disclosure, FIG. 6 shows a schematic drawing illustrating an arrangement of optical sensors, a grating image and an equivalent output of the optical sensors. The first row in FIG. 6 shows the arrangement of the optical sensors 106, wherein the areas with slanted lines represent the locations at which the optical sensors are disposed while the black areas represent that no optical sensor is disposed. The sensing period for the arrangement of the optical sensors 106 is Ps. The middle row in FIG. 6 shows the image of the periodic optical field LF generated by the grating 104, wherein the white portions represent bright bands while the black portions represent dark bands. There are gray transition portions between bright bands and dark bands. The period of the grating 104 is Pg which is not equal to the sensing period Ps. The lowest row in FIG. 6 represents the equivalent overlapping image generated inside the optical sensors 106. There is no light overlapped in the spatial domain. In other words, there is no image in the spatial domain. The equivalent overlapping image IM represents convolution result of the periodic optical field LF formed inside the optical sensors 106. According to FIG. 6, the optical fields of the bright bands may be sensed at the locations at which the optical sensors 106 are disposed. Therefore, the equivalent overlapping image IM corresponds to the locations where bright bands exist, wherein the equivalent Moiré period of the equivalent overlapping image IM is $$P_A = \frac{P_s \cdot P_g}{|P_g - P_s|}.$$

Figure 7:
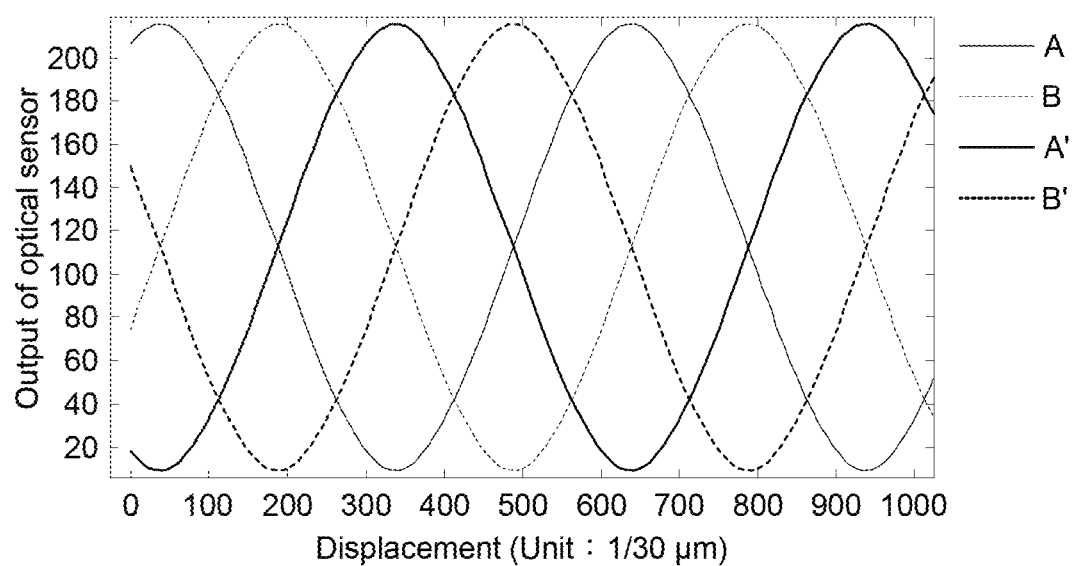
FIG. 7 shows a relationship between outputs of each optical sensor and displacements according to an embodiment of this disclosure.

FIG. 7 shows a relationship between the output of each optical sensor and displacements. Following the embodiment in FIG. 5, optical sensors may output positioning measurement signals A, B, A' and B'. While different equivalent overlapping images IM of the positioning measurement signals A, B, A' and B' outputted by the optical sensor 106 are generated according to the changes in displacements of the grating 104 relative to the optical sensor 106. FIG. 7 shows the changes of the position measurement signals A, B, A' and B' relative to the displacements of the grating 104. The horizontal axis represents the displacement (unit: ⅓₀ µm) of the grating 104. The vertical axis represents the intensity of the output signal of the optical sensors 106. Four different lines represent positioning measurement signals A, B, A' and B' having the phase difference of 90°. These positioning measurement signals are orthogonal signals approximate to cosine waves.

Figure 8:
FIG. 8 is a schematic diagram illustrating a high-frequency grating image according to an embodiment of this disclosure.
Figure 9:
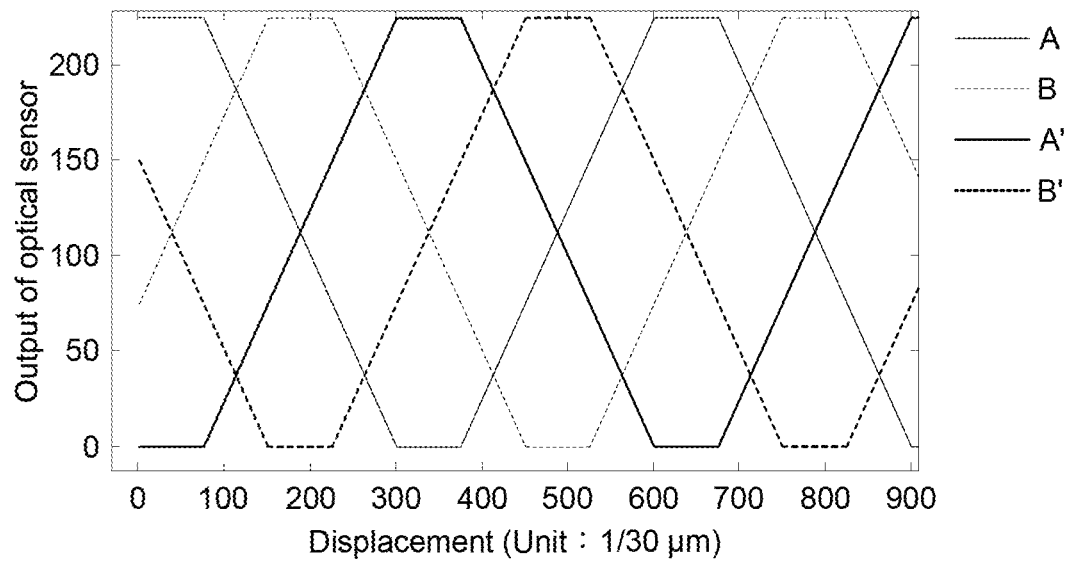
FIG. 9 shows the equivalent output of the optical sensor corresponding to a high frequency grating image according to an embodiment of this disclosure.

FIG. 8 shows a schematic view illustrating a square wave grating image according to an embodiment of this disclosure. In this embodiment, the periodic optical field LF generated by the grating 104 reserve all frequency component. In other words, the sharpness at the edges of the image of the periodic optical field LF is higher. Comparing with FIG. 6, less gray transition portions exist between the bright bands and the dark bands of the periodic optical field LF in FIG. 8. According to the periodic optical field LF shown in FIG. 8, FIG. 9 shows the positioning measurement signals outputted by one single optical sensor 106. FIG. 9 shows the equivalent output of the optical sensor corresponding to the square wave grating image. As shown in FIG. 9, saturation signals outputted from the optical sensor 106 occur due to the excessive amplitudes of positioning measurement signals. A part of phase information in these saturation signals is missed. Correct displacement information may not be obtained during the decoding process. The accuracy of the positioning measurement is correspondingly decreased.

In order to overcome the aforementioned problem, a non-uniform distribution design for the optical sensing sensitivity may be used for the optical sensor. A sensing area near the center of each optical sensor may be designed with higher optical sensing sensitivity, while the sensing area near the edges of each optical sensor may be designed with lower optical sensing sensitivity, so as to overcome the signal saturation problem. The output signals of the optical sensor may be regulated as orthogonal signals approximate to cosine or sinusoidal waves.

Figure 10:
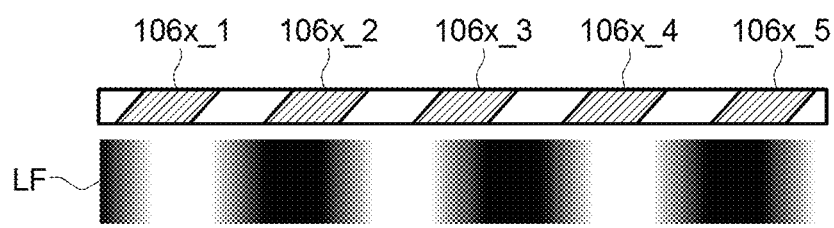
FIG. 10 shows optical sensors which are aslant disposed according to an embodiment of this disclosure.
Figure 11A:
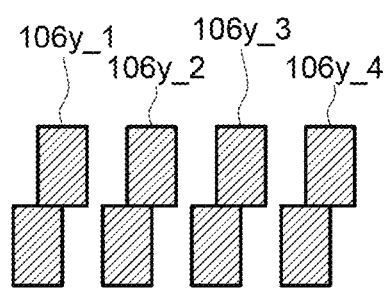
FIG. 11A is a schematic diagram illustrating an optical sensor according to an embodiment of this disclosure.
Figure 11B:
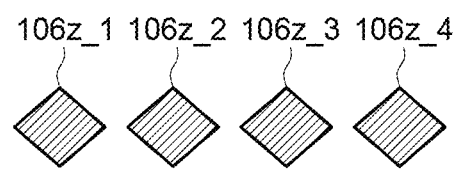
FIG. 11B is a schematic diagram illustrating an optical sensor according to an embodiment of this disclosure.

There are several implementation ways for the optical sensor with the non-uniform distribution design. FIG. 10 shows optical sensors which are aslant disposed according to an embodiment of this disclosure. In this embodiment, optical sensors 106x_1~106x_5 are aslant disposed, relative to the straight fringes of the periodic optical field. For example, the sensing area near the center of the optical sensor 106x_1 is designed with higher optical sensing sensitivity, while the sensing area near the edges of the optical sensor 106x_1 is designed with lower optical sensing sensitivity. FIG. 11A shows optical sensors according to an embodiment of this disclosure. In this embodiment, optical sensors 106y_1~106y_4 are formed by optical sensing blocks. FIG. 11B shows optical sensors according to an embodiment of this disclosure. In this embodiment, optical sensors 106z_1~106z_4 are formed by diamond-shaped optical sensors. For the embodiments in FIG. 10, FIG. 11A and FIG. 11B, by adjusting the shapes or the arrangement directions of the optical sensors, the optical sensing sensitivities on the surface of the optical sensors will be presented as a non-uniform distribution.

Figure 12:
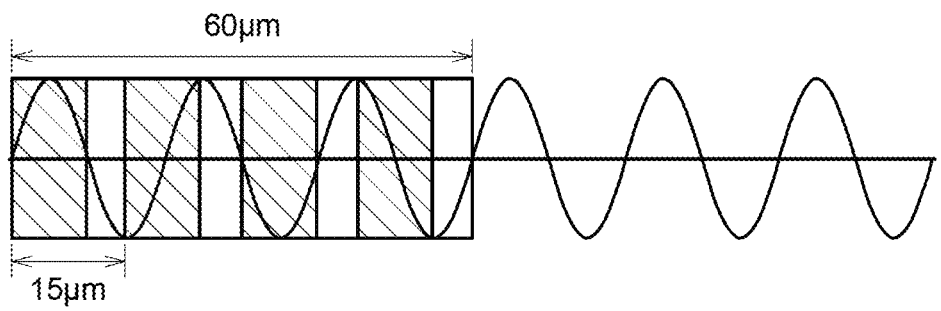
FIG. 12 shows the effective areas of an optical sensor according to an embodiment of this disclosure.

The size of the effective area of an optical sensor may be determined by a duty ratio of the optical sensor. FIG. 12 shows the effective areas of an optical sensor according to an embodiment of this disclosure. In this embodiment, the sensing period Ps is 15 μm. The slanted-line portions represent the effective areas of optical sensors. The optical sensor calculates the integral of the distribution of an optical field. In this embodiment, the optimization design of the duty ratio is performed for the contrast of an integral. Taking a sinusoidal-wave optical field as an example, the integral result of a periodic optical field may be expressed by $$P(x) = \int_0^{\kappa P_s} I_0 \sin\left(\frac{2\pi}{P_g}x\right),$$

wherein κ is a duty ratio. In order to achieve an optimum integral contrast, the optimized duty ratio K is selected such that the value $\{P(x)|_{max} - P(x)|_{min}\}$ is maximum. For example, the optimized duty ratio $$\kappa = \frac{2}{3}$$

through a calculation. For the optical sensor with a sensing period Ps=15 μm, the effective area is 10 μm.

For the hardware implementation, one single optical sensor 106 may comprise a photodiode, a photoresistor, a photographic plate, a charge coupled device (CCD), and so on. Taking a CCD as an example, the integrated circuit of the CCD includes a plurality of neatly arranged capacitors which convert optical signals into digital signals. Because the CCD itself has the characteristic of periodic spacing, it is suitable to be an optical sensor used in an embodiment of this disclosure. The unit pixel size is, for example, 3.75 μm*3.75 μm. For the embodiment in FIG. 4, the sensing period Ps may be set to 15 μm. In other words, four unit pixels may be utilized as an optical sensor (3.75 μm*4=15 μm). These four output signals from the four unit pixels may be appropriately processed as the output of the optical sensor for implementing the CCD as the optical sensor.

Figure 13:
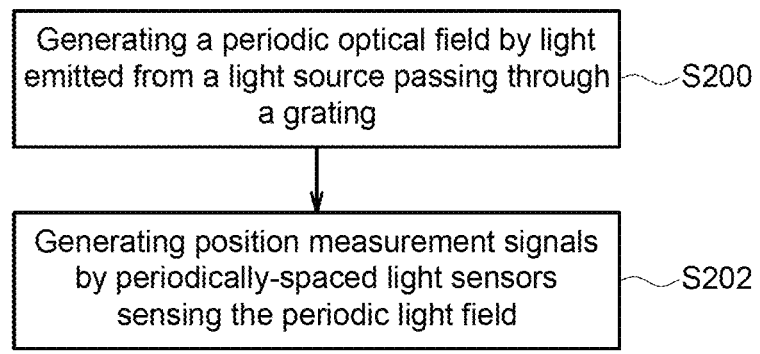
FIG. 13 shows a flowchart for a positioning measurement method according to an embodiment of this disclosure.

A positioning measurement method is also disclosed in this disclosure. FIG. 13 shows a flowchart for the positioning measurement method according to an embodiment of this disclosure. The method includes the following steps: generating a periodic optical field by light emitted by a light source and passing through a grating (step S200); and sensing, by plural light sensors, the periodic light field for generating one or more position measurement signals, wherein the plural light sensors are periodically spaced (step S202).

For the grating 104 with a period Pg of 20 μm, a sensing period Ps may be set to 15 μm or 25 μm. The aforementioned example describes the example with a sensing period Ps of 15 μm. According to another embodiment of this disclosure, a sensing period Ps is set to 25 μm for obtaining an equivalent Moiré period PA of 100 μm. In this embodiment, four optical sensors are disposed within five structured light periods for the spatial sampling.

Figure 14A:
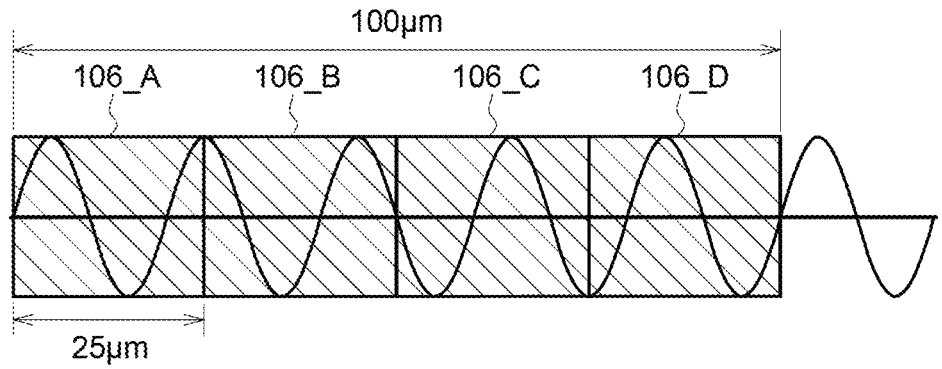
FIG. 14A is a schematic diagram illustrating an optical sensor having a duty ratio of 100% according to an embodiment of this disclosure.

As previously described, the optical sensor has a duty ratio. In this embodiment, when the duty ratio is 100%, as shown in FIG. 14A, the optical sensor fails output four orthogonal signals. Referring to FIG. 14A, the integral outputs for optical fields of the optical sensors 106_A and 106_B are the same. The integral outputs for optical fields of the optical sensors 106_C and 106_D are also the same. Therefore, with such a deployment, only two different phase outputs may be obtained.

Figure 14B:
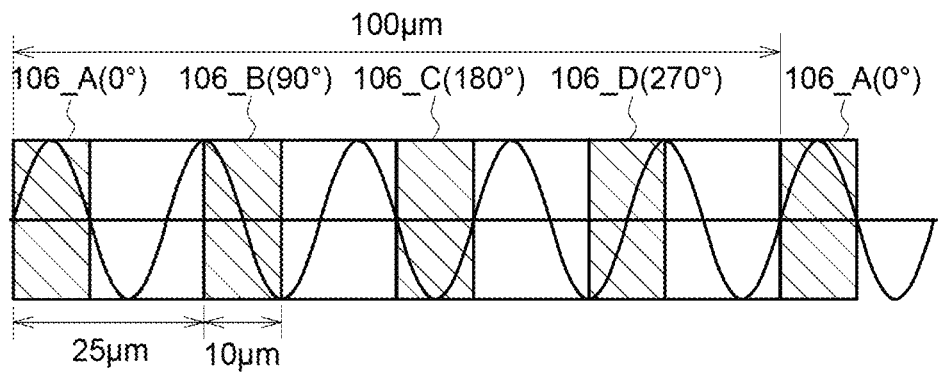
FIG. 14B is a schematic diagram illustrating an optical sensor having a lower duty ratio according to an embodiment of this disclosure.
Figure 14C:
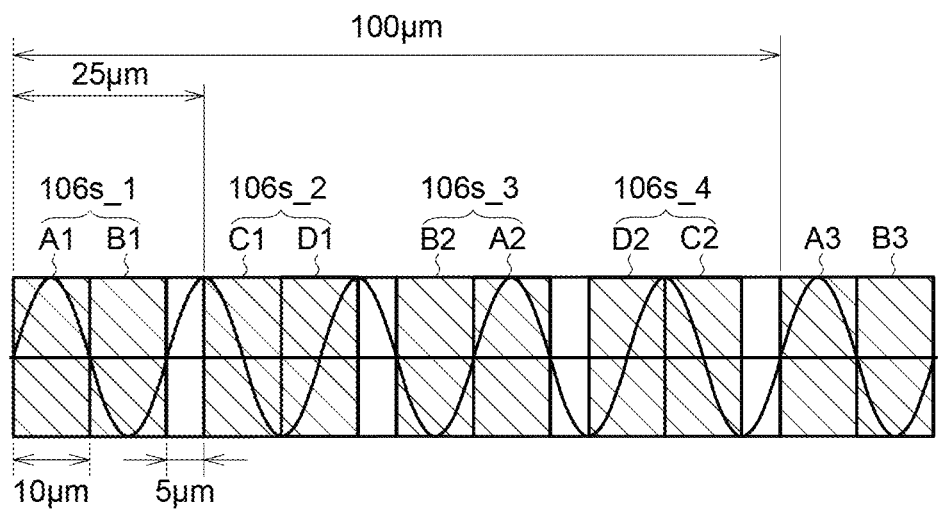
FIG. 14C shows an example in which an optical sensor comprises plural subsidiary light sampling sensors according to an embodiment of this disclosure.

As shown in FIG. 14B, when a duty ratio $$\kappa = \frac{2}{5},$$

four orthogonal signals may be successfully output. These four orthogonal signals respectively correspond to phase signals with 0°, 90°, 180° and 270°. Comparing with the embodiment in FIG. 12, when the equivalent Moiré period $P_A$ is 100 μm, the utilization ratio is low (lower duty ratio). Therefore, the cost of the hardware is increased. According to an embodiment of this disclosure, each optical sensor comprising a first light sampling sensor and a second light sampling sensor is disclosed. The first light sampling sensor is used to generate one of plural positioning measurement signals. The second light sampling sensor is used to generate another one of plural positioning measurement signals. Different positioning measurement signals are generated by the plural subsidiary light sampling sensors disposed for an optical sensor to increase the spatial utilization ratio (that is, higher duty ratio may be used) and successfully output four orthogonal signals. FIG. 14C is taken as an example.

FIG. 14C shows an example in which an optical sensor comprises plural subsidiary light sampling sensors according to an embodiment of this disclosure. In this embodiment, within an equivalent Moiré period PA of 100 μm, the optical sensor comprises a first optical sensor 106s_1, a second optical sensor 106s_2, a third optical sensor 106s_3 and a fourth optical sensor 106s_4, which are arranged successively. The first optical sensor 106s_1 comprises a first light sampling sensor A1 and a second light sampling sensor B1. The third optical sensor 106s_3 comprises a third light sampling sensor B2 and a fourth light sampling sensor A2. As shown in FIG. 14C, the integral outputs for optical fields of the first light sampling sensor A1 and the fourth light sampling sensor A2 are the same, which may be used to generate one of plural positioning measurement signals. The integral outputs for optical fields of the second light sampling sensor B1 and the third light sampling sensor B2 are the same, which may be used to generate another one of plural positioning measurement signals. Similarly, for the second optical sensor 106s_2 and the fourth optical sensor 1065_4, a subsidiary light sampling sensor C1 and a subsidiary light sampling sensor C2 may be used to generate one of plural positioning measurement signals. A subsidiary light sampling sensor D1 and a subsidiary light sampling sensor D2 may be used to generate another one of plural positioning measurement signals. Referring to FIG. 5 and FIG. 14C, the subsidiary light sampling sensor A1 may be connected to the subsidiary light sampling sensor A2 to generate a positioning measurement signal A. The subsidiary light sampling sensor B1 may be connected to the subsidiary light sampling sensor B2 to generate a positioning measurement signal A'. The subsidiary light sampling sensor C1 may be connected to the subsidiary light sampling sensor C2 to generate a positioning measurement signal B. The subsidiary light sampling sensor D1 may be connected to the subsidiary light sampling sensor D2 to generate a positioning measurement signal B'.

In FIG. 14C, the subsidiary light sampling sensor A1 is attached to the subsidiary light sampling sensor B1, which may be considered as an exemplary schematic diagram only. For the implementation, an insulation layer having a positive width might exist between the edges of subsidiary light sampling sensors. Without considering the thickness effect of the insulation layer, the duty ratio K of the optical sensor is 4/5. If the thickness effect of the insulation layer is considered, the duty ratio is about 72%. With an unequal distance sampling technology (in which an optical sensor comprises plural subsidiary light sampling sensors, also, the distance between the subsidiary light sampling sensor A1 and the subsidiary light sampling sensor A2 is not equal to the distance between the subsidiary light sampling sensor B1 and the subsidiary light sampling sensor B2), outputting four orthogonal signals can be achieved by the optical sensor having a high duty ratio.

According to the disclosed positioning measurement device and the method thereof, in order to calculate a relative displacement between the grating and an optical sensor, only one grating is needed to be disposed. That is, with those periodically spaced optical sensors, the periodic field generated by the grating can be read directly. In other words, an equivalent Moiré calculation signal can be obtained without the deployment of a subsidiary grating. Since only one grating is needed, a positioning measurement with such a simple structure may reduce the problem caused by an assembling error of the optical elements.

In addition, with the disclosed positioning measurement device and the method thereof, an equivalent Moiré period may be reduced, so as to decrease the interference of the external noise. The reason is when a Moiré period becomes short, a defect size becomes relatively large. A defect simultaneously affects the output signals of plural optical sensors. For example, positioning measurement signals A, B, A' and B' are simultaneously affected to form the common mode noise. Differential operation may be used for the back-end decoding of the positioning measurement device. For example, a noise component may be removed by subtracting the signal A from the signal A' or by subtracting the signal A' from the signal A. Therefore, the disclosed positioning measurement device and the method thereof can increase the common mode degree of the external interference to raise the ability resisting external noise interference. In addition, because the difference between the period of the optical sensor and the period of the grating become long, a higher error tolerance may be obtained for a relative movement error between the encoder head and the grating scale.

It will be apparent to those skilled in the art that various modifications and variations can be made to the structure of the disclosed embodiments. It is intended that the specification and examples be considered as exemplars only, with a true scape of the disclosure being indicated by the following claims and their equivalents.

What is claimed is:

1. A positioning measurement device, comprising:
   a light source;
   a grating, wherein a periodic optical field is generated by light emitted by the light source and passing through the grating; and
   a plurality of optical sensors, wherein the optical sensors are periodically spaced for sensing the periodic optical field to generate a plurality of positioning measurement signals,
   wherein the plurality of optical sensors are periodically spaced by a sensing period $P_s$, a relation between the sensing period $P_s$ and a period $P_g$ of the grating is expressed as: $P_s = P_g \times (1 + 1/n_A)$, where $n_A$ is a positive integer.

2. The positioning measurement device according to claim 1, wherein the grating is a transparent type grating while the light source and the optical sensors are disposed on two sides of the grating.

3. The positioning measurement device according to claim 1, wherein the grating is a reflective type grating, and the light emitted by the light source is reflected by the grating to form the periodic optical field.

4. The positioning measurement device according to claim 1, wherein there is a distance between the grating and the plurality of optical sensors, wherein the light emitted by the light source passes through the grating to form the periodic optical field at a plurality of locations of the plurality of optical sensors, and wherein the distance is related to a period of the grating and a light wavelength of the light source.

5. The positioning measurement device according to claim 1, further comprising an image forming device disposed between the grating and the plurality of optical sensors, wherein the imaging forming device comprises a convex lens, wherein the light emitted by the light source passes through the grating and the imaging forming device to form the periodic optical field at a plurality of locations of the plurality of optical sensors.

6. The positioning measurement device according to claim 1, wherein the plurality of optical sensors are aslant disposed relative to straight fringes of the periodic optical field.

7. The positioning measurement device according to claim 1, wherein optical sensing sensitivities of the plurality of optical sensors are presented as a non-uniform distribution.

8. The positioning measurement device according to claim 1, wherein each of the plurality of optical sensors comprises a first light sampling sensor and a second light sampling sensor, wherein the first light sampling sensor is used to generate one of the plural positioning measurement signals while the second light sampling sensor is used to generate another one of the plural positioning measurement signals.

9. The positioning measurement device according to claim 1, wherein the plurality of optical sensors comprise a first optical sensor, a second optical sensor and a third optical sensor, which are arranged successively, wherein the first optical sensor comprises a first light sampling sensor and a second light sampling sensor while the third optical sensor comprises a third light sampling sensor and a fourth light sampling sensor, wherein the first light sampling sensor and the fourth light sampling sensor are used to generate one of the plural positioning measurement signals while the second light sampling sensor and the third light sampling sensor are used to generate another one of the plural positioning measurement signals.

10. The positioning measurement device according to claim 9, a first distance between the first light sampling sensor and the fourth light sampling sensor is different from a second distance between the second light sampling sensor and the third light sampling sensor.

11. The positioning measurement device according to claim 9, wherein the second optical sensor comprises a fourth light sampling sensor and a fifth light sampling sensor, and the first light sampling sensor, the second light sampling sensor, the fourth light sampling sensor, and the fifth light sampling sensor are arranged successively, wherein a first distance between the first light sampling sensor and the second light sampling sensor is different from a second distance between the second light sampling sensor and the fourth light sampling sensor.

12. A positioning measurement method, comprising:
generating a periodic optical field by light emitted by a light source and passing through a grating; and
sensing, by plural light sensors, the periodic light field for generating a plurality of positioning measurement signals, wherein the plural light sensors are periodically spaced,
wherein the plurality of optical sensors are periodically spaced by a sensing period $P_s$, a relation between the sensing period $P_s$ and a period $P_g$ of the grating is expressed as: $P_s = P_g \times (1+1/n_A)$, where $n_A$ is a positive integer.

13. The positioning measurement method according to claim 12, wherein the grating is a transparent type grating while the light source and the optical sensors are disposed on two sides of the grating.

14. The positioning measurement method according to claim 12, wherein the grating is a reflective type grating, and the light emitted by the light source is reflected by the grating to form the periodic optical field.

15. The positioning measurement method according to claim 12, wherein there is a distance between the grating and the plurality of optical sensors, wherein the light emitted by the light source passes through the grating to form the periodic optical field at a plurality of locations of the plurality of optical sensors, and wherein the distance is related to a period of the grating and a light wavelength of the light source.

16. The positioning measurement method according to claim 12, wherein the step of generating the periodic optical field further comprises:
providing an image forming device disposed between the grating and the plurality of optical sensors, wherein the imaging forming device comprises a convex lens, wherein the light emitted by the light source passes through the grating and the imaging forming device to form the periodic optical field at a plurality of locations of the plurality of optical sensors.

17. The positioning measurement method according to claim 12, wherein the plurality of optical sensors are aslant disposed relative to straight fringes of the periodic optical field.

18. The positioning measurement method according to claim 12, wherein optical sensing sensitivities of the plurality of optical sensors are presented as a non-uniform distribution.

19. The positioning measurement method according to claim 12, wherein each of the plurality of optical sensors comprises a first light sampling sensor and a second light sampling sensor, wherein the first light sampling sensor is used to generate one of the plural positioning measurement signals while the second light sampling sensor is used to generate another one of the plural positioning measurement signals.

20. The positioning measurement method according to claim 12, wherein the plurality of optical sensors comprise a first optical sensor, a second optical sensor and a third optical sensor, which are arranged successively, wherein the first optical sensor comprises a first light sampling sensor and a second light sampling sensor while the third optical sensor comprises a third light sampling sensor and a fourth light sampling sensor, wherein the first light sampling sensor and the fourth light sampling sensor are used to generate one of the plural positioning measurement signals while the second light sampling sensor and the third light sampling sensor are used to generate another one of the plural positioning measurement signals.

21. The positioning measurement method according to claim 20, a first distance between the first light sampling sensor and the fourth light sampling sensor is different from a second distance between the second light sampling sensor and the third light sampling sensor.

22. The positioning measurement method according to claim 20, wherein
the second optical sensor comprises a fourth light sampling sensor and a fifth light sampling sensor, and the first light sampling sensor, the second light sampling sensor, the fourth light sampling sensor, and the fifth light sampling sensor are arranged successively, wherein a first distance between the first light sampling sensor and the second light sampling sensor is different from a second distance between the second light sampling sensor and the fourth light sampling sensor.

23. A positioning measurement device, comprising:
a light source;
a grating, wherein a periodic optical field is generated by light emitted by the light source and passing through the grating; and
a plurality of optical sensors, wherein the optical sensors are periodically spaced for sensing the periodic optical field to generate a plurality of positioning measurement signals, wherein the plurality of optical sensors are periodically spaced by a sensing period $P_s$, a relation between the sensing period $P_s$ and a period $P_g$ of the grating is expressed as:

$$P_s = P_g \times \left(1 - \frac{1}{n_A}\right),$$

and $P_s \neq P_g \times 3/4$, where $n_A$ is a positive integer.

* * * * *